(No Model.)

J. F. SHOOP.
NUT LOCK.

No. 416,960. Patented Dec. 10, 1889.

Witnesses:
E. C. Wurdeman
W. S. Duvall

Inventor
John F. Shoop
By his Attorneys,
C. A. Snow & Co.

UNITED STATES PATENT OFFICE.

JOHN F. SHOOP, OF WISSAHICKON, PENNSYLVANIA.

NUT-LOCK.

SPECIFICATION forming part of Letters Patent No. 416,960, dated December 10, 1889.

Application filed September 10, 1889. Serial No. 323,546. (No model.)

*To all whom it may concern:*

Be it known that I, JOHN F. SHOOP, a citizen of the United States, residing at Wissahickon, in the county of Philadelphia and State of Pennsylvania, have invented a new and useful Nut-Lock, of which the following is a specification.

This invention has relation to nut-locks of that class employing a washer having a countersunk recess adapted to receive the nut and a toothed periphery into which is adapted to take a holding-pawl.

The objects and advantages of the invention will hereinafter appear, and the novel features thereof be particularly pointed out in the claim.

Figure 1:
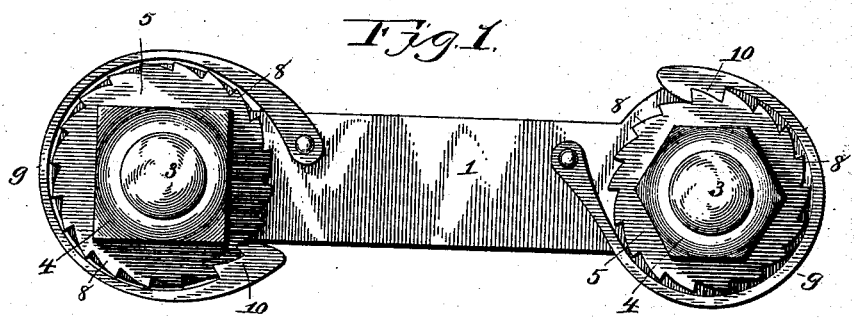
Figure 2:
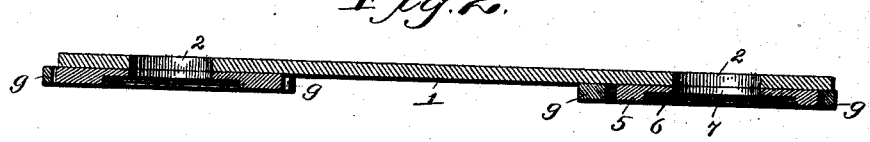
Figure 3:
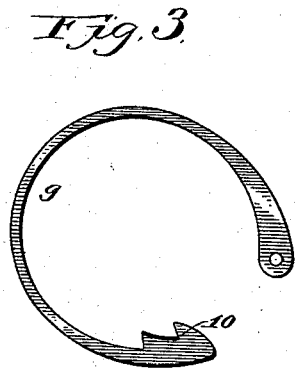
Figure 4:
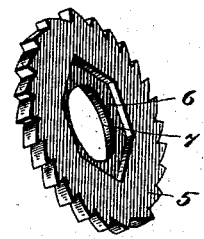

Referring to the drawings, Figure 1 is a side elevation of a fish-plate, bolts, and nuts provided with locks constructed in accordance with my invention. Fig. 2 is a transverse longitudinal section. Figs. 3 and 4 are details in perspective of the spring locking-pawl and washer.

Like numerals of reference indicate like parts in all the figures of the drawings.

Although my invention is herein shown and described as applied to the connecting-bolts of a railway fish-plate, it is apparent that the same may be used with equal advantage in any other desired construction of joint.

1 represents a fish-plate, or it may be any other fixed object, through which is formed the bolt-openings 2, and located in the same are the bolts 3, having the nuts 4 threaded thereon.

5 represents the washer, the outer face of which is provided with a countersunk recess 6, agreeing in contour with that of the nut and provided with a central bolt-receiving opening 7. The outer periphery of the washer is provided with ratchet-teeth 8.

9 represents a spring locking-pawl, the inner end of which is perforated and bolted to the outer surface of the fish-plate or other object adjacent to the toothed periphery of the washer. The spring is circular in plan and terminates near its point of connection in one or more inwardly-disposed teeth 10, adapted to engage one or more adjacent teeth of the washer.

The operation of my invention is as follows: The washer is first mounted upon the bolt and the spring relaxed or spread to receive the same, and after its release the ratchet is closely embraced thereby. The nut is then placed in position within the countersunk recess and tightened upon the bolt by any ordinary wrench. In tightening the nut it will be apparent that the washer will be revolved therewith, the teeth of the pawl riding over the teeth of the ratchet and preventing any retrograde movement of the washer, and consequently the nut. In order to remove the nut, the spring must be spread, so that its teeth are disengaged from the ratchet, when the nut may be removed by an ordinary wrench and in the usual manner.

To the left of Fig. 1 I have shown the invention as adapted for square nuts and to the right of said figure as adapted for hexagonal nuts.

Having described my invention, what I claim is—

The combination, with a fish-plate or other object, of a bolt passed through the same, a ratchet-washer mounted over the bolt, a nut seated in a recess in the face of the washer, and a circular spring having one end secured to the fish-plate or other object and closely embracing the washer, and having its end terminating in teeth engaging those of the ratchet, substantially as specified.

In testimony that I claim the foregoing as my own I have hereto affixed my signature in presence of two witnesses.

JOHN F. SHOOP.

Witnesses:
JOHN H. SIGGERS,
R. J. MARSHALL.